Feb. 21, 1928.  1,660,131
H. LENFERS
REVERSIBLE LIGHTING ATTACHMENT FOR BICYCLES AND OTHER VEHICLES
Filed Oct. 18, 1927
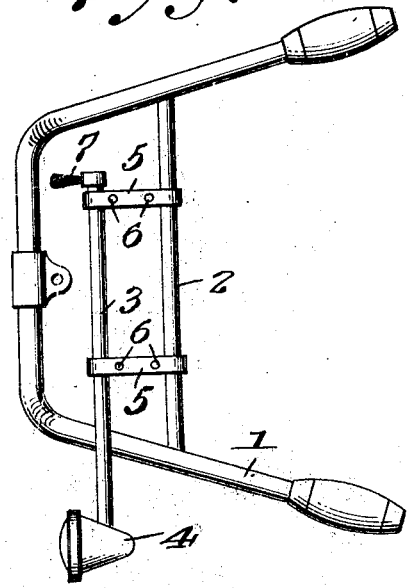
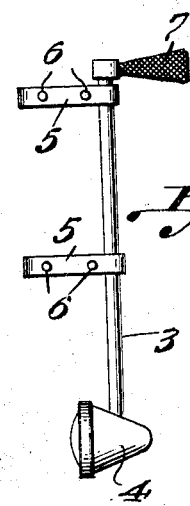
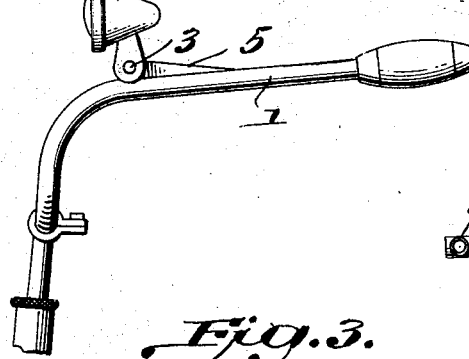
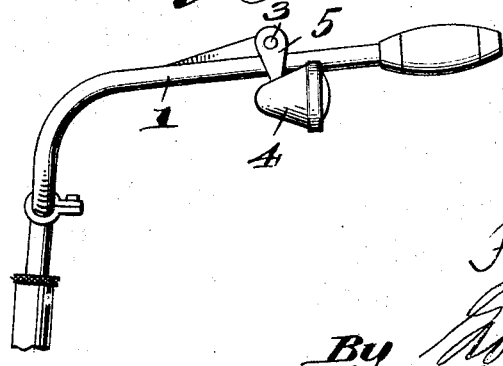
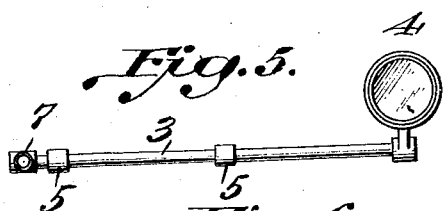
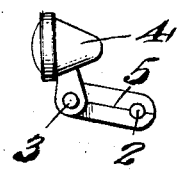

Patented Feb. 21, 1928.

1,660,131

UNITED STATES PATENT OFFICE.

HARRY LENFERS, OF EVANSVILLE, INDIANA.

REVERSIBLE LIGHTING ATTACHMENT FOR BICYCLES AND OTHER VEHICLES.

Application filed October 18, 1927. Serial No. 226,914.

This invention relates to a reversible lighting attachment for bicycles and other vehicles.

The object of this invention is to provide a simple, inexpensive and efficient lighting device which can be readily attached to the cross piece of the handle bar of a bicycle, motorcycle or the like, or applied to any vehicle, and which will enable the rider or driver to quickly dispose the lamp or lamps of the attachment so that the rays of light will be directed ahead, or, to reverse the device so that the rays of light may be directed to the rear.

While bicycles and motorcycles are intended to carry their own tail lights, independent of their head lights, the usual tail light does not afford a satisfactory source of illumination should it be necessary to direct a light to the rear as, for instance, in an emergency to prevent a driver coming up from the rear from running into the bicycle or motorcycle.

The invention enables the lamp to serve not only as a headlight but as an emergency light and as a "trouble" light, particularly if illumination of the rear part of the bicycle or motorcycle is needed.

One of the advantages of the invention is the adaptability of the device for instant reversal, even when the bicycle or motorcycle is in motion, by mere manipulation by the rider, without requiring the use of tools or appliances.

The attachment may be used as the main headlight, or, as auxiliary to the usual headlight and it can be taken off if it is not needed.

My lighting attachment is characterized by its mounting, whereby it has a "walk-over" motion when swung rearwardly or forwardly, as distinguished from a mere pivotal action.

In the accompanying drawings:

Figure 1, is a plan view of the handle bar of a bicycle or motorcycle, showing my improvements applied thereto;

Fig. 2, is a side elevation thereof;

Fig. 3, is a view like Fig. 2 but showing the attachment in reversed position;

Fig. 4, is a plan view of the attachment by itself;

Fig. 5, is an elevation thereof; and

Fig. 6, is a side view thereof.

The ordinary handle bar of a bicycle or motorcycle is shown at 1 and has the usual cross bar or brace 2.

My improved lighting attachment is shown by itself in Figs. 4, 5, 6 and in Figs. 1, 2, 3 it is illustrated as applied to the cross bar 2.

The attachment has a rod or tube 3 which carries at one end any suitable headlight or spotlight 4. The light 4 may be rigidly connected to the rod or tube 3 or it may be swiveled or mounted in any desired manner to turn in relation to said rod or tube for purposes of adjustment but it is intended to be fixed in relation to the rod 3 when it is properly adjusted thereby to enable it to swing bodily with the rod in "walk-over" fashion, as will now be explained.

Clamped to the rod or tube 3 are arms or brackets 5, preferably of two-piece construction held together by bolts 6 or other suitable fastenings. The rod 3 is provided with a suitable handle 7.

The arms or brackets 5 are rockably mounted on the handle bar cross rod 2 but the joints are sufficiently tight so that the attachment will not vibrate up and down when the bicycle or motorcycle is in motion.

Ordinarily the rod or tube 3 lies forwardly of the rod 2 and rests upon one of the handle bars as shown in Figs. 1 and 2, the rays of light from the lamp 4 being then directed ahead when the lamp is in use.

When it is desired to illuminate the road to the rear of the bicycle, whether temporarily or for some time, the rider or driver simply grasps the handle 7 and bodily rocks or swings over the entire attachment rearwardly in "walk-over" fashion to bring it to the position shown in Fig. 3, whereupon it is completely reversed, the arms 5 swinging on the cross rod 2. This operation may take place when the bicycle is in motion and at any time the attachment may be swung back to its normal position as shown in Fig. 1.

My invention enables the rider to instantly throw the light rearwardly to "pick up" objects in the rear or approaching from the rear and to signal or warn those in the rear of the presence of the bicycle ahead of them.

What I claim is:

1. The combination with the handle bar of a bicycle or motorcycle and with the cross bar of said handle bar, of a pair of arms or brackets rockably mounted on said cross bars to swing bodily as a unit in "walk-over" fashion, a long horizontally extending rod carried by said arms or brackets and adapted to rest on one of the handle bars when in forward or rearward position, and a lamp carried by said rod, said arms or brackets enabling the rod and lamp to be positioned forwardly of the cross bar or rearwardly thereof and enabling the light from the lamp to be directed either forwardly or rearwardly without interference with the handle bar or its cross bar.

2. The combination with the handle bar of a bicycle or motorcycle, of a pair of arms or brackets rockably mounted on the horizontal part of said handle bar to swing bodily as a unit in "walk-over" fashion, a long, horizontally extending rod carried by said arms or brackets and adapted to swing as a unit with them and to rest on one of the handle bars, and a lamp carried by said rod beyond the handle bar on which it is adapted to rest, said arms and rod being adapted to be swung forwardly or rearwardly to dispose the lamp in forward or rearward pointing position.

In testimony whereof I affix my signature.

HARRY LENFERS.